Feb. 15, 1938.  C. E. SUMMERS  2,108,514
VALVE MECHANISM
Filed Aug. 16, 1935
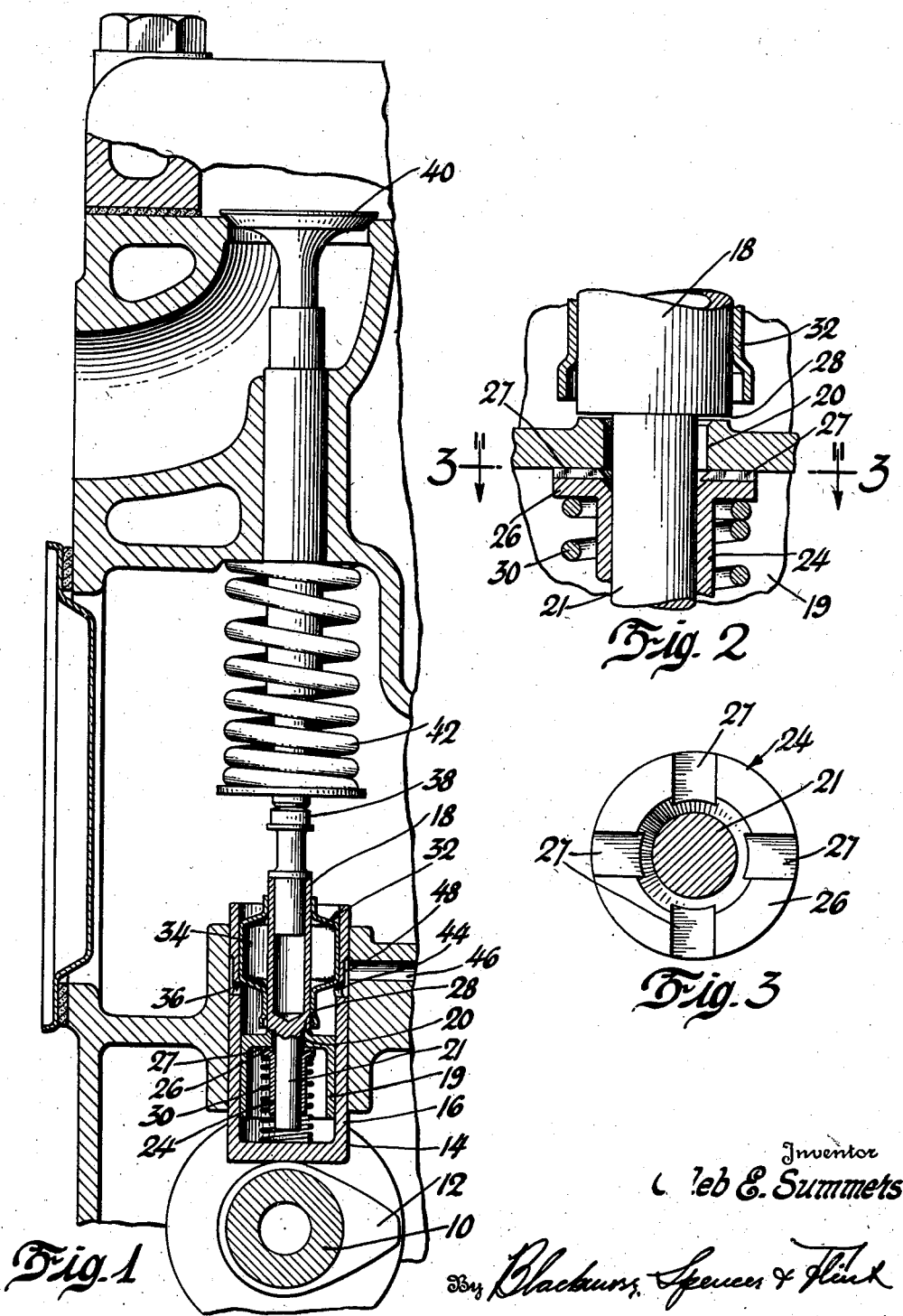

Patented Feb. 15, 1938

2,108,514

UNITED STATES PATENT OFFICE 2,108,514

VALVE MECHANISM

Caleb E. Summers, Pontiac, Mich., assignor to General Motors Corporation, Detroit, Mich., a corporation of Delaware Application August 16, 1935, Serial No. 36,465

9 Claims. (Cl. 123—90)

This invention has to do with hydraulic take-up mechanism especially adapted for use in the valve mechanism of internal combustion engines. In the form illustrated the take-up mechanism is embodied in a valve tappet of the type usually interposed between the camshaft and the valve stem or push rod and adapted to transmit the valve operating thrust of the cam.

The improved take-up mechanism consists essentially of a plurality of telescoping thrust devices, one of which is preferably in the form of a cup, while the other comprises a piston slidably mounted in the cup and loosely connected to a thrust transmitting member which serves to control the flow of fluid into and out of the hydraulic chamber formed between the piston and the bottom of the cup. Means is provided to yieldingly urge the thrust-transmitting member in a direction to permit flow, but upon application of thrust to the valve operating system the flow is shut off and the fluid in the chamber acts as a fixed abutment during the balance of the valve operating cycle.

When the valve operating pressure is removed from the system the thrust-transmitting member is moved to a position to permit flow of fluid into and out of the bottom of the hydraulic chamber to compensate for variations in the length of the train of mechanism due to expansion and contraction of the parts or other causes.

The principal advantages of the invention are the controllable lash and positive action of the means controlling flow of fluid into and out of the hydraulic chamber. It has been undesirable to have tappets which take-up to no lash since a slight eccentricity of the base circles of the cam tends to make the valve ride, thereby lessening its pressure on its seat, interfering with heat flow and putting extra duty and harder wear on the tappet. The improved construction is also characterized by absence of ball check valves, or the like, which operate with very light pressure, and are objectionable since the slightest obstruction holds them off their seat.

Other objects and advantages of the invention will be apparent in the course of the following description in which:

Figure 1 is a sectional view through a portion of an automobile engine showing the construction and location of the device.

Figure 2 is an enlarged sectional view of a portion of the device.

Figure 3 is a section on line 3—3 of Figure 2.

In Figure 1 there is shown a portion of a conventional automobile engine provided with camshaft 10 having cam 12 thereon adapted to periodically lift the tappet designated 14 in its entirety. The tappet comprises telescoping thrust devices one of which consists of the cup 16, and the other consists of thrust member 18, together with the piston 19 to which it is loosely connected. To accomplish this the piston 19 is preferably apertured at 20 to loosely receive the lower reduced portion 21 of the thrust member 18 and sleeve 24 is a press-fit upon the extension 21. The sleeve 24 is provided at its upper end with an outturned flange 26 formed with radial grooves 27 as best shown in Figure 3 which provides passages communicating with the clearance about the member 18. The space between the upper surface of the flange 26 and the shoulder 28 formed at the junction of the reduced portion 21 with the main portion of the thrust member 18 is slightly greater than the thickness of the end wall of piston 19, thereby permitting a slight relative movement between the thrust member and piston. The opposed surfaces of the shoulder 28 and the piston when brought into contact with each other seal the passages from the hydraulic chamber constituted by the grooves 27 and the clearance between the extension 21 and the aperture in the piston. In the bottom of the cup is located the spring 30 which reacts against the flange 26 so as to urge the thrust member upwardly to take up lash and at the same time tend to separate the sealing surfaces at the shoulder 28 to permit fluid to enter or leave the hydraulic chamber to compensate for variations in lash due to expansion or contraction of the parts of the valve mechanism.

32 indicates a tubular guide member which may be formed of sheet metal, and is preferably a press fit within the upper portion of the cup, the lower portion of the enlarged portion 34 of the guide resting on shoulder 36, provided in the cup member 16.

While the upper portion of the thrust member 18 could, if desired, be shaped to directly engage the valve stem, I have preferred to employ an adapter 38 which is seated on the member 18. At 40 is shown the valve with which the adapter 38 is in operative engagement, and 42 indicates the spring normally urging the valve on its seat. In order to insure a supply of oil to the tappet, the cup 16 is preferably apertured at 44, and oil is supplied to the tappet through passage 46 which is preferably at all times in communication with a reduced annular portion 48 of the tappet, as shown. In the construction of the device the fit of the piston 19 in the cup 16 will be held to close tolerances. With the passage to the hydraulic chamber open the space between the shoulder 28 and the top of the piston should preferably be rather slight, for instance, on the order of .005".

The device operates as follows: When the tappet reaches the base circle on the cam, the spring 30 urges the thrust member 18 and adapter 38 upwardly into engagement with the end of the valve stem 40. Under these conditions the passage leading to the hydraulic chamber beneath the piston will be open, as illustrated.

When the cam starts its lifting movement, cup 14 is raised and with it the piston 19, while the thrust member 18 and its associate parts are held against upward movement by the action of the valve spring 42. As a consequence the flow of oil from the hydraulic chamber is shut off by engagement of the surfaces at 28 and from then on throughout the valve opening and closing movement the oil in the chamber acts as a solid abutment to transmit thrust. When the valve reaches its seat and the system is relieved of the pressure of the valve spring 42, spring 30 comes into play and urges the cup 16 downwardly against the base circle of the cam, and at the same time urges the thrust member 18 and its associated parts upwardly into engagement with the end of the valve stem, thereby opening the passage beneath shoulder 28, so that if there has been slight leakage or other cause for adjustment as, for example, contraction of the parts owing to cooling, the increased volume of the hydraulic chamber due to the greater separation of the piston 19 and the cup 16 causes oil to be drawn into the hydraulic chamber.

An advantage of the construction resides in the fact that the lash in the valve operating system may be made whatever value is desired by adjusting the distance between the upper surface of flange 26 and the shoulder 28.

It will be understood that the described action takes place during each operation of the valve gear, and that the tappet operates as a positive pump to draw oil into the hydraulic chamber each time the valve seats independently of any pressure from the oiling system, then as soon as the cam starts to lift the tappet the valve at 28 is closed with all the force of the main valve spring 42.

The reservoir inside the cup 16 and below the openings 44 is sufficient to supply immediately the oil required to put all tappets in perfect adjustment when the engine is started up after a long period of idleness even though the thrust members 18 under pressure of the valve spring have naturally settled down so that the reduced portions 21 rest on the bottoms of the tappets. The provision for such engagement provides a safety factor to permit operation of the engine even though the tappets should in some manner become empty of oil.

Since the hydraulic chamber is vented upon each operation, opportunity is presented for the escape of air should any be present. However, the sliding fit between the cup 16 and its guide and between the enlarged portion of thrust member 18 and its guide provide for escape of air in the reservoir above the piston so that there is little likelihood of air entering the hydraulic chamber.

While the invention is described in connection with a tappet for internal combustion engines it will be apparent that it is of utility wherever a hydraulic take-up device may be found desirable.

I claim:

1. In hydraulic take-up means the combination of telescoping thrust devices, one of said devices being adapted to rest on a body of fluid contained in the other, and valve means associated with said last-named device for controlling the passage of fluid to and from said body and including a member having a portion exposed outside of said telescoping thrust members so as to receive thrust and transmit it to one of said members and yielding means normally urging said valve means toward open position.

2. An hydraulic valve tappet comprising a cup, an apertured piston slidably mounted in the cup, a thrust member passing loosely through the aperture in the piston, means loosely connecting the thrust member and piston and adapted to permit limited relative movement therebetween, means yieldingly urging the thrust member out of the cup, and cooperating sealing surfaces on the thrust member and piston brought into play upon inward movement of the thrust member for sealing the passage between the piston and thrust member constituted by the loose fit of the thrust member, in the aperture in the piston.

3. In hydraulic take-up mechanism the combination of a cup, a piston slidable in the cup, said piston being provided with a passage adapted to permit flow of fluid from one side of the piston to the other, thrust transmitting means arranged in series thrust transmitting relation with said cup and piston and loosely connected to the piston so as to permit relative movement of said means and piston, valve means actuated by relative movement of the piston and thrust transmitting means for closing said passage, and means yieldingly urging said thrust transmitting means in a direction to open said valve means.

4. In hydraulic take-up mechanism the combination of a cup, a piston member slidable in the cup, said piston member having a bore therein, a thrust transmitting member arranged in series thrust transmitting relation with said cup and piston and extending through said bore and fitting loosely therein so as to permit passage of fluid therearound, one of said members having abutments thereon adapted to engage the other, said abutments being spaced apart to permit limited independent movement of said members in the line of thrust, one of said abutments and the other of said members being provided with mating surfaces adapted to engage to prevent passage of fluid through said bore, and means for yieldingly urging one of said members in a direction to hold said surfaces out of sealing engagement.

5. In hydraulic take-up mechanism the combination of a cup, a piston slidable in the cup, said piston having a bore therein, a thrust transmitting member extending through said bore and having a loose lateral fit therein to permit passage of fluid through said bore around said thrust member, means limiting the endwise movement of said thrust member with respect to said piston, said piston and member being provided with cooperating valve means adapted to be closed by inward movement of the thrust member relative to the piston or by outward movement of the piston relative to the thrust member, and means for yieldingly urging the thrust member out of the cup.

6. In hydraulic take-up mechanism the combination of a cup, a piston slidable in the cup, said piston having a bore therein, a thrust transmitting member extending through said bore and having a loose lateral fit therein to permit passage of fluid through said bore around said thrust member, means limiting the endwise movement of said thrust member with respect to said piston, said piston and member being provided with cooperating valve means adapted to be closed by inward movement of the thrust member relative to the piston or by outward movement of the piston relative to the thrust member, means for yieldingly urging the thrust member out of the cup, said cup being provided with guiding means for said thrust member.

7. The combination of an operating member, an operated member, means for transmitting motion from said operating member to said operated member comprising a plurality of thrust elements interposed between said members, a body of fluid confined between said elements, valve means associated with one of said elements adapted to control flow of fluid to and from said body comprising a valve member arranged to transmit thrust from one of said members to said element, and means for yieldingly urging said valve member toward open position.

8. In hydraulic take-up mechanism for use in operating the valves of internal combustion engines and the like, the combination of an operating member, an operated member, and means for transmitting thrust from the operating member to the operated member comprising telescoping thrust devices, one of said devices being adapted to rest on a body of fluid contained in the other, and valve means controlling the passage of fluid to and from said body and including a relatively movable valve member interposed between said fluid supported thrust device and one of said members so as to transmit thrust therebetween.

9. In hydraulic take-up mechanism for use in operating the valves of internal combustion engines and the like, the combination of an operating member, an operated member, means for transmitting thrust from the operating member to the operated member comprising telescoping thrust devices, one of said devices being adapted to rest on a body of fluid contained in the other, and valve means controlling the passage of fluid to and from said body and including a member interposed between said piston and one of said members so as to transmit thrust therebetween, and means normally urging said valve means toward open position.

CALEB E. SUMMERS.